No. 631,197. Patented Aug. 15, 1899.
A. BOURKE.
FISHING LINE FLOAT.
(Application filed Apr. 14, 1899.)
(No Model.)
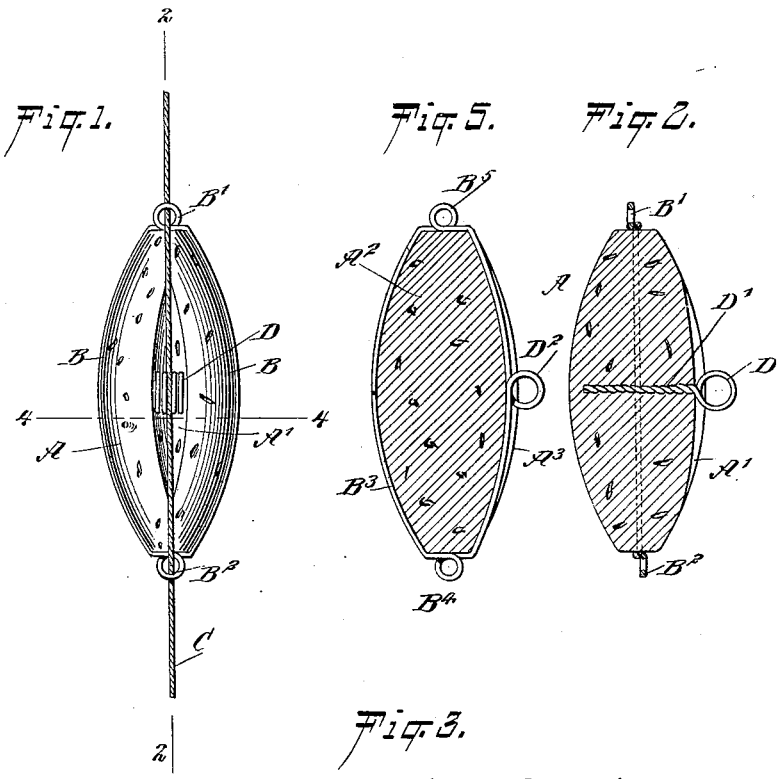
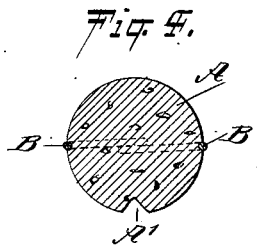
WITNESSES:
INVENTOR
Alphege Bourke.
BY
ATTORNEYS.

UNITED STATES PATENT OFFICE.

ALPHEGE BOURKE, OF VALPARAISO, INDIANA.

FISHING-LINE FLOAT.

SPECIFICATION forming part of Letters Patent No. 631,197, dated August 15, 1899.

Application filed April 14, 1899. Serial No. 713,008. (No model.)

*To all whom it may concern:*

Be it known that I, ALPHEGE BOURKE, of Valparaiso, in the county of Porter and State of Indiana, have invented a new and Improved Fishing-Line Float, of which the following is a full, clear, and exact description.

The object of the invention is to provide a new and improved float for fishing-lines and arranged to permit a fisherman to readily adjust the float on a line at the desired distance from the hook for fishing at any depth.

The invention consists of novel features and parts and combinations of the same, as will be fully described hereinafter and then pointed out in the claims.

A practical embodiment of my invention is represented in the accompanying drawings, forming a part of this specification, in which similar characters of reference indicate corresponding parts in all the views.

Figure 1 is a side elevation of the improvement. Fig. 2 is a cross-section of the same on the line 2 2 in Fig. 1. Fig. 3 is an enlarged perspective view of the line-lock. Fig. 4 is a sectional plan view of the improvement on the line 4 4 in Fig. 1, and Fig. 5 is a sectional side elevation of a modified form of the improvement.

The improved fishing-line float, as shown in Figs. 1, 2, and 4, is provided with a body A, made in the usual shape, as shown in the drawings, and preferably of cork or like floatable material and having a wire bent longitudinally on opposite sides of the body along the surface thereof to form at its ends loops B' B² for the passage of the line C, said line between said loops extending through a longitudinal groove A', formed in the peripheral surface of the said body.

Approximately midway between the loops B' B², within the groove A', is arranged a coil D, adapted to receive and clamp the line between the loops B' B². The coil D thus forms a locking device for the line and permits the operator to readily draw the line out between the members of the coil and shift the body A along the line to obtain the desired distance between the hook and the float for fishing at any depth of water.

The locking device is preferably made of a single piece of wire formed into a plurality of turns for the coil D, the ends of the wire being twisted together to form a shank D', passed transversely into the body A, the turns of the coil standing in a longitudinal direction—that is, in alinement with the groove A'.

The device is very simple and durable in construction, is not liable to get out of order, and, as above stated, permits a fisherman to readily adjust the float on the line at the desired point.

In the modified form shown in Fig. 5 the body-wire B³ is formed on one of its side members with a coil D², and this member and coil extend in the longitudinal groove A³ of the body. The ends of the wire are formed into loops B⁴ and B⁵ for the passage of the line C, adapted to be locked in place by inserting it into the coil D², as previously explained relative to the coil D.

Having thus fully described my invention, I claim as new and desire to secure by Letters Patent—

1. A fishing-line float, comprising a body, a wire extending on opposite sides of the said body and terminating in loops at the ends of the body, the fishing-line being adapted to pass through said loops, and a locking device for the line and held approximately midway between said loops, said locking device consisting of a coil for clamping the line between its turns, substantially as shown and described.

2. A fishing-line float, comprising a float-body having a longitudinally-extending groove on its surface, a wire fitting said body on opposite sides and terminating in loops at the ends of the body, for the fishing-line to pass through the loops and along the groove, and a locking device consisting of a coil having a number of turns and arranged in the groove of the body for receiving and clamping the line, substantially as shown and described.

3. A fishing-line float comprising a body, and a wire shaped to fit upon the body and provided with a loop at each end and with a coil about midway between its ends, substantially as described.

4. A fishing-line float consisting of a body, and a wire extending on opposite sides of the body and formed with a loop at each end and with a coil in one of its side members, substantially as described.

ALPHEGE BOURKE.

Witnesses:
FRANK P. JONES,
AARON L. JONES.